United States Patent [19]

Johnson et al.

[11] 4,057,662

[45] Nov. 8, 1977

[54] BLOCK-RESISTANT GYPSUM BOARD

[75] Inventors: Robert M. Johnson, Kenmore; Daniel A. Winkowski, Tonawanda; Rodney A. Stiling, Snyder, all of N.Y.

[73] Assignee: National Gypsum Company, Buffalo, N.Y.

[21] Appl. No.: 657,377

[22] Filed: Feb. 12, 1976

[51] Int. Cl.² .......................... B05D 5/00; B05D 7/00; B32B 31/12; B32B 31/14
[52] U.S. Cl. ...................................... 427/209; 156/40; 156/44; 156/45; 427/407 D; 427/411; 427/429; 428/70; 428/203; 428/538
[58] Field of Search .................... 428/203, 70, 538; 156/40, 45, 42, 43, 44; 427/209, 407, 408, 411, 429

[56] References Cited

U.S. PATENT DOCUMENTS

| | | | |
|---|---|---|---|
| 1,556,164 | 10/1925 | Schumacher | 156/42 |
| 3,007,808 | 11/1961 | Smith | 427/209 X |
| 3,055,768 | 9/1962 | Lassiter | 427/209 X |
| 3,068,118 | 12/1962 | Biskup et al. | 428/302 |
| 3,218,225 | 11/1965 | Petropoulos | 428/503 |
| 3,350,257 | 10/1967 | Hourigan et al. | 428/70 |
| 3,402,062 | 9/1968 | Mohan | 427/209 X |
| 3,927,245 | 12/1975 | Roth et al. | 427/411 X |

*Primary Examiner*—Thomas J. Herbert, Jr.
*Attorney, Agent, or Firm*—Robert F. Hause

[57] ABSTRACT

A predecorated printed paper on the gypsum wallboard with a clear washable coating over the printed paper, and having a thin coating of polyethylene emulsion on the back paper which overcomes the tendency of the coated predecorated paper to stick to the back paper of an adjacent board when the boards are piled in stacks for storage and shipment.

5 Claims, 2 Drawing Figures

BLOCK-RESISTANT GYPSUM BOARD

This invention relates to predecorated gypsum wallboard, and particularly to such board having a block-resistant thin polyethylene film on the entire back face.

A desirable form of gypsum wallboard, particularly for use in mobile homes, has a plastic coating applied throughout the front face of the board, which, for example, may be an acrylic coating, which is applied after the board is made, to give the face of the board durability and washability during its subsequent years of use. Depending on the many variable conditions that exist with regard to the application of this face coating and the subsequent stacking of the board, for warehousing and for shipping, it is very possible that the face of a board with this coating may become stuck to the back of an adjacent board, a condition commonly referred to as blocking.

In accordance with the present invention, a very thin coating of polyethylene is applied during board manufacture to the back face of the wallboard to which the above-described durable front face coating is subsequently applied, prior to stacking the boards. The polyethylene coating may be applied by a manifold pipe with evenly spaced holes or by spray nozzles and then evenly spread by a felt dragged along the back face of the board, prior to the board being dried in the gypsum board drier.

It is an object of the present invention to provide means for applying a durable face coating to gypsum wallboard and subsequently stacking the wallboard in piles without causing blocking.

It is a further object to provide a resin-coated predecorated gypsum board in which the resin coating may have blocking tendencies without resulting in the occurrence of blocking when stacked.

It is a still further object of the invention to provide an anti-blocking back coating which can be applied during the manufacture of gypsum wallboard and thus without separate production line therefor and the consequent extra handling that would be required.

These and other objects of the invention will be more readily apparent when considered in relation to the preferred embodiments as set forth in the specification and shown in the drawings in which.

Figure 1:
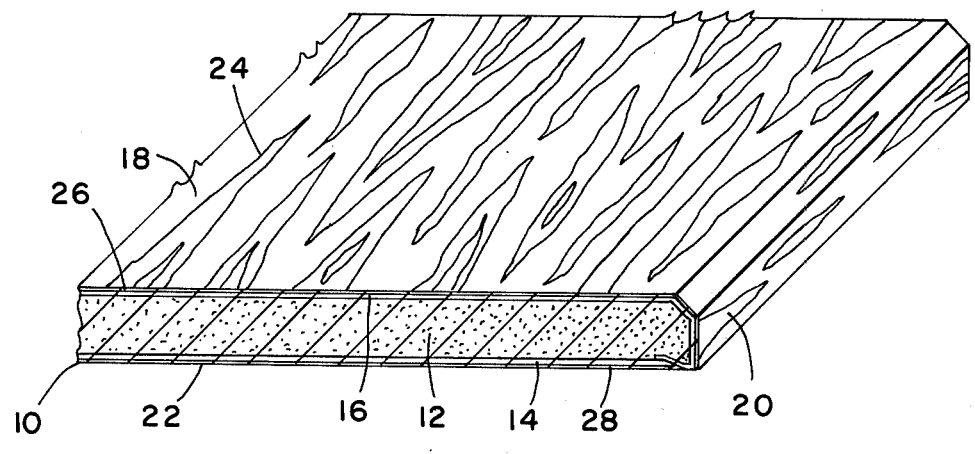
FIG. 1 is an isometric view of a portion of a gypsum wallboard embodying the present invention.

Referring to FIG. 1, there is shown a portion of a gypsum wallboard 10. Wallboard 10 includes a set gypsum core 12, a greyback paper liner 14, and a face paper liner 16.

Face paper liner 16 extends throughout the front face 18 of wallboard 10, and also around each of the two side edges 20 of the wallboard 10, and onto a narrow extent of the back face 22. Greyback paper liner 14 extends throughout substantially the entire back face 22 of wallboard 10, overlapping slightly the edges of the face paper liner 16 which are disposed on the back face 22 of the wallboard.

In a preferred form of the invention, the face paper liner 16 is a paper which has an attractive wall design printed on it such as the wood grain pattern 24. To provide good wear resistance to the predecorated face paper liner 16, an acrylic coating 26 completely covers the front face 18, and may also extend onto the edges 20, and is of such translucensce or transparency as to permit the pattern 24 to be seen therethrough.

On the back face 22, extending entirely from edge 20 to the opposite edge 20, not shown, there is a very thin continuous polyethylene film 28. Polyethylene film 28 has been found to prevent blocking when wallboards with coating 26 on the front face are stacked, front face to back face, in large stacks, substantially immediately after oven curing of the coating 26.

Polyethylene film 28 is preferably applied to the back face 22 of wallboard 10 during the wallboard manufacturing process. A polyethylene emulsion, such as Poly-Em 12, a product of Cosden Oil and Chemical Company, has been found suitable. The Poly-Em 12 emulsion is an emulsion of polyethylene in water, with 44% to 49% polyethylene solids, 54.5% to 56.5% total solids, a weight of 8.0 to 8.4 pounds per gallon, a pH of 10.5 to 11.2, a maximum Brookfield viscosity of 600 at 25° C with spindle No. 1 at 6 RPM, a 30% minimum transmittance, a particle size of below 0.1 micron, and solid polymer properties of 0.935 gm/cc density, 16,000 apparent average molecular weight and a melting point by the modified ring and ball method of 107.6° C.

Figure 2:
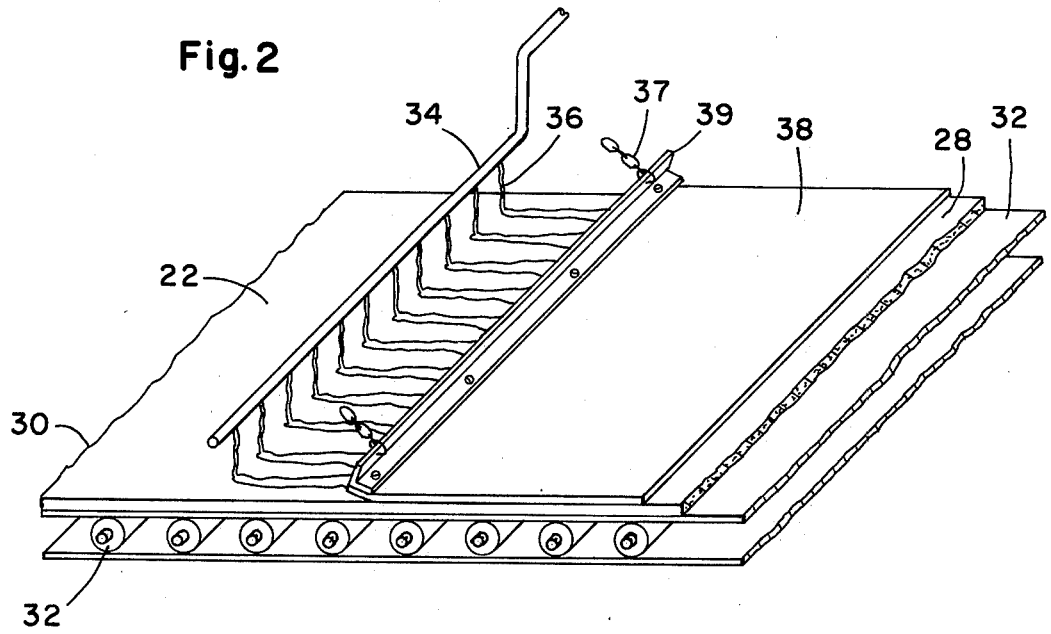
FIG. 2 is an isometric view of a gypsum wallboard manufacturing facility showing the application of the back coating of the present invention.

The polyethylene emulsion may be applied as shown in FIG. 2. Uncoated gypsum wallboard endless web 30 is shown in its uncut form, after being formed and as it is moving along a conveyor 32 about 100 feet from the forming roll. The back face 22 of the endless wallboard web 30 is on the top as the board moves along the conveyor 32.

A polyethylene emulsion supply pipe 34 extends across the full width of the wallboard web 30, which is passing thereunder. The pipe 34 has a plurality of evenly spaced apart small holes on the bottom thereof. Polyethylene emulsion, preferably diluted with water to about 15% solids, is continuously supplied to pipe 34 and a plurality of small streams 36 of the polyethylene emulsion continuously fall on the back face 22 at evenly spaced lines thereacross. The emulsion may also be applied to the felt by airless or air spray or by other suitable means. The emulsion is supplied at a rate such that 0.5 gram of solids are applied per square foot.

Immediately downstream from the point where the polyethylene emulsion falls on the back face 22 there is a piece of felt 38, which is at least as wide as the wallboard web 30 and about 3 feet long, held in a fixed position, by chains 37 attached to angle iron 39, so that it lays on the back face 22 of the wallboard web 30, as the wallboard web 30 slides along thereunder. The felt 38 causes the polyethylene emulsion, just previously deposited, to be spread substantially uniformly throughout the back face 22.

Following application of the polyethylene emulsion to the back face 22, the wallboard web 30 with the polyethylene thereon proceeds along the conveyor 32, with the emulsion drying as it progresses. The endless wallboard web is then cut into desired lengths, turned upside down so the front face 18 is up, and then conveyed into a gypsum wallboard kiln for drying of the wallboard. In the kiln, the board is conveyed on roller conveyors which are relatively hot. These hot roller conveyors cause the polyethylene on the back face 22, which is riding on the conveyors, to become very smooth and to be cured. The kiln rollers will be at temperatures of about 250° F to 600° F (120° C to 300° C).

The primary purpose of the gypsum board kiln is the removal of the excess water from the gypsum core 12, which when heated passes out from the core 12 through the greyback paper liner 14 and the face paper liner 16. Generally, any form of film or coating applied to either paper liner prior to drying results in sealing the paper so that when drying the core in a kiln the escaping steam pushes the paper away from the core. Surprisingly, with the polyethylene emulsion on the back face 22, during drying in the kiln, the steam escapes from the core without causing loss of bond between the core 12 and the greyback paper liner 14.

Following are test results from a test in which the permeability of gypsum wallboard having 0.5 gram of polyethylene solids per square foot on the back paper is compared with that of uncoated wallboard and with wallboard having 1.5 grams per square foot.

| Specimen | Average Water Loss gm/24 Hrs. | Water Vapor Transmission gm/24 Hr/m² | Permeance Metric Perms |
|---|---|---|---|
| 1. Uncoated Board | 1.84 | 309.8 | 33.2 |
| 2. Board with 0.5 gm/ft² | 1.65 | 277.8 | 29.8 |
| 3. Board with 1.5 gm/ft² | 1.41 | 237.4 | 25.4 |

This test was carried out in accordance with the ASTM E-96 water vapor transmission test procedure, using ½ inch gypsum wallboard. Circular specimens were prepared having a $5.94 \times 10^{-3} m^2$ area. The specimen edges were sealed and the specimens were sealed against a shallow cup of water, half full, of equal diameter. The test was conducted in a room having a temperature of 70° ± 2° F and 50 ± 2% relative humidity.

Water vapor transmission and permeance were determined by measuring the average water loss in grams each 24 hours. Water vapor transmission equals the grams of water loss/24 hours/m². Permeance equals the water vapor transmission divided by the vapor pressure difference between the two sides of the test sample in mm Hg, which is obtained as follows:

$$\frac{WVT}{\Delta P} = \frac{WVT}{S(R_1 - R_2)}$$

where:

$S$ = Saturated vapor pressure at test temperature in mm Hg
$R_1$ = Relative humidity within cup
$R_2$ = Relative humidity in test room
$S$ at 70° F is 18.65 mm Hg.

From the above data it can be seen that the preferred 0.5 gm/ft² coating of polyethylene makes only a very small reduction in the permeability of wallboard, compared to regular uncoated wallboard.

After drying in the wallboard kiln, the wallboard 10 with the polyethylene film 28, is coated with an acrylic emulsion to form acrylic coating 26 on the front face 18. Acrylic emulsion may be Rhoplex E552 made by Rohm and Haas, which is purchased at 43% solids in water, with a pH of 9 to 10, a viscosity of between 20 to 100 cps, having a milky white liquid appearance, a weight of 8.9 pounds per gallon, a minimum film forming temperature of 16° C, and a cured Tukon hardness of 4. The 43% solids are purchased emulsion is then mixed with an additional amount of water to produce a sprayable thinned emulsion of 24.3% solids. This thinned acrylic emulsion may be used clear or with a slight tint, such as about 1 part raw umber to 50 parts emulsion solids.

The thinned acrylic emulsion is spray applied to the face paper liner by passing the board under an oscillating paint sprayer, which applies about 5.6 grams of thinned emulsion per square foot, or, in other words, about 1.4 grams of solids per square foot.

After spray application, the coating is dried and the acrylic resin cured by using a gas fired infrared oven and heating to cause a surface temperature on the coated board of between 275° – 350° F (135° – 175° C) as the board leaves the oven. This acrylic resin coating, although cured, still has the characteristic of tending to adhere to a back paper of an adjacent stacked wallboard if these wallboards are stacked, following the application, with this coating adjacent a plain back paper, that is one which doesn't have the novel polyethylene coating and thus is uncoated.

The completed wallboard 10 may then be packaged, front face to back face, in stacks, without causing blocking.

Having completed a detailed disclosure of the preferred embodiments of our invention so that those skilled in the art may practice the same, we contemplate that variations may be made without departing from the essence of the invention or the scope of the appended claims.

We claim:

1. The method of making gypsum wallboard comprising the steps of forming a set gypsum core between face paper and back paper, modifying said gypsum wallboard of set core and paper by coating said back paper with a formed-in-place thin film of polyethylene, and also modifying said gypsum wallboard of set core and paper by coating said face paper with a protective acrylic resin coating formed in place having the characteristic of tending to adhere to a back paper of an adjacent stacked wallboard if said wallboard is stacked with the resin coating adjacent plain uncoated back paper following the application of said resin coating, whereby said wallboards may be stacked face to back without causing blocking.

2. The method of claim 1 wherein said polyethylene film is applied on said back paper subsequent to the forming of said core between said face paper and said back paper and prior to the drying of said board in a wallboard dryer.

3. The method of claim 2 wherein an aqueous polyethylene emulsion is spread on the said back paper while the formed board is progressing along a conveyor as a continuous web prior to being cut into individual desired lengths.

4. The method of claim 3 wherein said emulsion is continuously fed in a plurality of liquid streams disposed across the width of said board, and said emulsion is subsequently spread evenly throughout the surface of the back of the continuous web of board.

5. The method of claim 4 wherein said emulsion is spread by dragging a draped piece of felt along the back face after depositing the emulsion thereon.

* * * * *